(12) United States Patent
Yang et al.

(10) Patent No.: US 9,544,930 B2
(45) Date of Patent: Jan. 10, 2017

(54) COMMUNICATION INTERCEPTION METHOD, BASE STATION, AND TERMINAL

(71) Applicant: HUAWEI TECHNOLOGIES CO., LTD., Shenzhen (CN)

(72) Inventors: Xiaodong Yang, Beijing (CN); Brian Classon, Palatine, IL (US); Bo Lin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 178 days.

(21) Appl. No.: 14/299,525

(22) Filed: Jun. 9, 2014

(65) Prior Publication Data
US 2014/0314010 A1 Oct. 23, 2014

Related U.S. Application Data

(63) Continuation of application No. PCT/CN2012/086157, filed on Dec. 7, 2012.

(30) Foreign Application Priority Data

Dec. 7, 2011 (CN) .......................... 2011 1 0403036

(51) Int. Cl.
| | | |
|---|---|---|
| *H04W 4/00* | (2009.01) | |
| *H04W 76/02* | (2009.01) | |
| *H04L 29/06* | (2006.01) | |
| *H04W 12/02* | (2009.01) | |
| *H04M 3/22* | (2006.01) | |
| *H04W 4/02* | (2009.01) | |

(52) U.S. Cl.
CPC .......... *H04W 76/023* (2013.01); *H04L 63/306* (2013.01); *H04M 3/2281* (2013.01); *H04W 4/005* (2013.01); *H04W 12/02* (2013.01); *H04W 4/02* (2013.01)

(58) Field of Classification Search
CPC ..................................................... H04W 28/04
USPC ......................................................... 370/329
See application file for complete search history.

(56) References Cited

U.S. PATENT DOCUMENTS

| | | |
|---|---|---|
| 7,079,488 B1 | 7/2006 | Kumar et al. |
| 7,283,521 B1 | 10/2007 | Ryan |
| 7,295,848 B1 | 11/2007 | Eloranta |
| 7,310,331 B2 | 12/2007 | Sjoblom |
| 7,415,099 B2 | 8/2008 | Qian et al. |
| 7,447,909 B2 | 11/2008 | Reith |

(Continued)

FOREIGN PATENT DOCUMENTS

| | | |
|---|---|---|
| CN | 1719788 A | 1/2006 |
| CN | 101753526 A | 6/2010 |

OTHER PUBLICATIONS

Chinese Search Report dated Aug. 10, 2015 in corresponding Chinese Patent Application No. 201110403036.0 (3 pages).

(Continued)

*Primary Examiner* — Samina Choudhry
(74) *Attorney, Agent, or Firm* — Staas & Halsey LLP

(57) ABSTRACT

A communication interception method by a base station, a device and a terminal belonging to device-to-device (D2D) communication includes: receiving a message sent by a device, where the message is used to instruct interception of D2D data of the terminal belonging to the D2D communication; obtaining the D2D data according to the message; and sending the obtained D2D data to the device.

8 Claims, 3 Drawing Sheets

(56) References Cited

U.S. PATENT DOCUMENTS

| | | | |
|---|---|---|---|
| 7,535,848 B2 | 5/2009 | Dong et al. | |
| 7,620,389 B2 | 11/2009 | Kallio et al. | |
| 7,730,521 B1 | 6/2010 | Thesayi et al. | |
| 7,908,354 B2 | 3/2011 | Fernandez | |
| 7,921,198 B2 | 4/2011 | Fernandez | |
| 7,965,645 B2 | 6/2011 | Pelletier | |
| 2002/0150096 A1 | 10/2002 | Sjoblom | |
| 2004/0157629 A1 | 8/2004 | Kallio et al. | |
| 2004/0202295 A1 | 10/2004 | Shen et al. | |
| 2004/0255126 A1 | 12/2004 | Reith | |
| 2007/0211639 A1* | 9/2007 | Spalt | H04L 63/304 370/241 |
| 2007/0297376 A1 | 12/2007 | Gass | |
| 2008/0095146 A1 | 4/2008 | Granzer | |
| 2008/0275972 A1 | 11/2008 | Ellis et al. | |
| 2009/0135814 A1 | 5/2009 | Kreusch et al. | |
| 2009/0220091 A1 | 9/2009 | Howard | |
| 2010/0002880 A1 | 1/2010 | Yoon et al. | |
| 2011/0096669 A1 | 4/2011 | Iovieno et al. | |
| 2012/0294163 A1* | 11/2012 | Turtinen | H04W 72/042 370/252 |

OTHER PUBLICATIONS

Chinese Notice of Allowance dated Aug. 25, 2015 in corresponding Chinese Patent Application No. 201110403036.0 (2 pages).
"*Lawful Interception for Circuit Switched Services in 3rd Generation Mobile Communications System*"; Xingyu et al.; The Third Research Institute of Ministry of Public Security, Shanghai 200031, China; School of Software Engineering, Tongji University, Shanghai 201804, China; Oct. 10, 2010; (5 pages).
"*IP Network Based Modern Lawful Interception Technology and Solution*"; Liu Yongchun, Alcatel-Lucent Shanghai-Bell, Co, LTD., Beijing 100031, China; China New Telecommunications Sep. 2010; (6 pages).
"*Handover interface for Lawful Interception (LI) (Release 11)*"; 3GPP TS 33.108 V11.1.0 (Sep. 2011); 3rd Generation Partnership Project; Technical Specification Group Services and System Aspects; 3G security; (194 pages).
"*Lawful interception architecture and functions (Release 11)*"; 3GPP TS 33.107 V11.0.0 (Feb. 2011); 3rd Generation Partnership Project; Technical Specification Group Services and System Aspects; 3G security; (136 pages).
"*Feasibility Study for Proximity Services (ProSe) (Release 12)*"; 3GPP TR 22.8xx V0.1.0 (Nov. 2011); 3rd Generation Partnership Project; Technical Specification Group SA; Global System for Mobile Communications; (11 pages).
Extended European Search Report dated Jan. 22, 2015 in related European Patent Application No. 12856398.8 (6 pages).
Institute for Information Industry (III): "*Proximity aware service consideration on lawful interception*" 3rd Generation Partnership Project (3GPP), Mobile Competence Centre; 650, Route des Lucioles; F-06921 Sophia-Antipolis Cedex; France vol. SA WG1, No. Kyoto, Japan; 20120213-20120217, Feb. 6, 2012, XP050574732 (3 pages).
PCT International Search Report and Written Opinion—PCT Forms PCT/ISA/210, PCT/ISA/220, PCT/ISA/237, dated Mar. 21, 2013 in corresponding PCT Application No. PCT/CN2012/086157 (11 pages).
"*3rd Generation Partnership Project; Technical Specification Group Services and System Aspects; 3G security; Lawful Interception requirements (Release 11)*"; 3GPP TS 33.106 V11.1.0 (Sep. 2011); (17 pages).

* cited by examiner

COMMUNICATION INTERCEPTION METHOD, BASE STATION, AND TERMINAL

CROSS-REFERENCE TO RELATED APPLICATION

This application is a continuation of International Application No. PCT/CN2012/086157, filed on Dec. 7, 2012, which claims priority to Chinese Patent Application No. CN201110403036.0, filed on Dec. 7, 2011, both of which are hereby incorporated by reference in their entireties.

TECHNICAL FIELD

The present invention relates to a mobile communications technology, and in particular, to a communication interception method, a base station, and a terminal.

BACKGROUND

Due to security concerns, a public security organ or another department may intercept communication content of a user within a legally authorized scope, and such interception is called "lawful interception". Currently, when a user performs communication by means of a mobile communications network and the like, data such as a voice of the user is carried by the network. For example, after a user A and a user B set up a call, a voice of the user A is sent to a base station where the user A is located, the base station of the user A sends the voice of the user A to a PGW (Packet Data Network Gateway, packet data network gateway) and an SGW (Serving Gate Way, serving gateway), the PGW and the SGW forward the voice of the user A to a base station where the user B is located, and the base station where the user B is located sends the voice of the user A to the user B, to implement transmission of the voice of the user A to the user B; the transmission of a voice of the user B to the user A is similar. Because the data such as the voice of the user is carried by the network, when the data such as the voice of the user needs to be intercepted in the prior art, the data such as the voice of the user is directly obtained from the SGW or the PGW, thereby implementing interception on the user. However, with the development of a mobile communications technology, an idea of position-based D2D (device to device) is being discussed and has brought about some applications. The core of the D2D idea is that data between users can be directly transmitted without being carried by a network if the distance between the users is short enough.

SUMMARY

To solve a technical problem by an embodiment of the present invention is to provide a communication interception method, a base station, and a terminal, which can prevent a defect of failing to intercept D2D data.

To solve the technical problem, an embodiment of the present invention provides a communication interception method, including:

receiving a first message sent by a first device, where the first message is used to instruct interception of D2D data of a terminal belonging to device to device D2D;

obtaining the D2D data according to the first message; and sending the obtained D2D data to the first device.

Accordingly, an embodiment of the present invention further provides a communication interception method, including:

receiving, by a terminal belonging to device to device D2D, a second message sent by a base station, where the second message is used to trigger the terminal belonging to D2D to record D2D data of the terminal;

recording, by the terminal belonging to D2D, the D2D data according to the second message; and sending, by the terminal belonging to D2D, the recorded D2D data to the base station.

Accordingly, an embodiment of the present invention further provides a base station, including:

a receiver, configured to receive a first message sent by a first device, where the first message is used to instruct interception of D2D data of a terminal belonging to device to device D2D;

a processor, configured to obtain the D2D data according to the first message; and a sender, configured to send the obtained D2D data to the first device.

Accordingly, an embodiment of the present invention further provides a terminal, including:

a receiver, configured to receive a second message sent by a base station, where the second message is used to trigger the terminal to record device to device D2D data of the terminal;

a processor, configured to record the D2D data according to the second message; and a sender, configured to send the recorded D2D data to the base station.

Implementation of the embodiments of the present invention has the following beneficial effects:

In the embodiments of the present invention, a first message sent by a first device is received, where the first message is used to instruct interception of D2D data of a terminal belonging to D2D, the D2D data is obtained according to the first message, and the obtained D2D data is sent to the first device, which achieves an objective of performing interception on D2D communication during the D2D communication, and thereby prevents a defect of failing to intercept the D2D data when the terminal belonging to D2D performs the D2D communication in the prior art.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
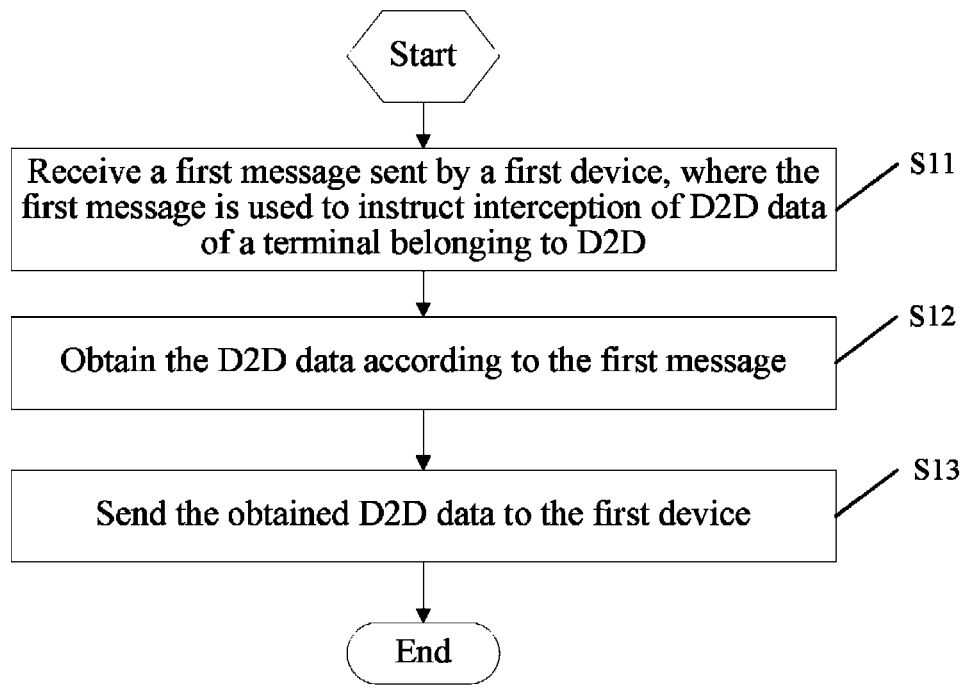
FIG. 1 is a schematic flowchart of a first embodiment of a communication interception method provided by the present invention.

Referring to FIG. 1, FIG. 1 is a schematic flowchart of a first embodiment of a communication interception method provided by the present invention. The process of the method in FIG. 1 may be executed by a base station, for example, may be an ENB (Evolved Node B, evolved node B) in the 3GPP (The 3rd Generation Partnership Project, 3rd Generation Partnership Project). The process of the method in FIG. 1 includes:

Step S11: Receive a first message sent by a first device, where the first message is used to instruct interception of D2D data of a terminal belonging to D2D.

The first device may be an MME (Mobility Management Entity, mobility management entity), a PGW, an SGW, or a third-party client. For example, when the first device is the MME, and the process of the method in FIG. 1 is executed by the ENB, the MME sends the first message to the ENB through an interface (this interface is called an "S1" interface) between the MME and the ENB, and carries, in the message, an identity of the terminal belonging to D2D that is required to be intercepted, so as to indicate to the ENB the specific terminal belonging to D2D that is required to be intercepted. It should be noted that, the third-party client is defined relative to the MME, the SGW, and the PGW. The MME, the SGW, and the PGW are devices in a core network, and the third-party client refers to a device in a non-core network. For example, the third-party client may be implemented by using a notebook computer. After the notebook computer is connected to the base station, the notebook computer may send the first message to the base station, to instruct the base station to intercept the D2D data of the terminal belonging to D2D. It should be noted that, the D2D data refers to data directly sent from one terminal to another terminal without being forwarded by a network.

Step S12: Obtain the D2D data according to the first message.

There are many manners for obtaining the D2D data. For example, the D2D data is actively uploaded by the terminal belonging to D2D, or the D2D data of the terminal belonging to D2D is received according to scheduling information used when the terminal belonging to D2D performs D2D communication.

Step S13: Send the D2D data obtained in step S12 to the first device.

In this embodiment, it should be noted that, in a D2D idea, when a terminal performs D2D communication, signaling for implementing the D2D communication is completely or partially carried by a network (including a base station, an MME, and the like). Therefore, the network can know when the terminal is performing the D2D communication, and thereby the D2D data of the terminal is intercepted at the right time.

In the embodiment of the present invention, a first message used to intercept D2D data of a terminal belonging to D2D is sent to a base station, and the base station obtains the D2D data of the terminal belonging to D2D according to the received first message; therefore, the base station implements interception of the D2D data, preventing a defect of failing to intercept the D2D data because of the fact that the D2D data is not carried by a network in the prior art. The embodiment of the present invention enriches and improves an existing interception manner.

Figure 2:
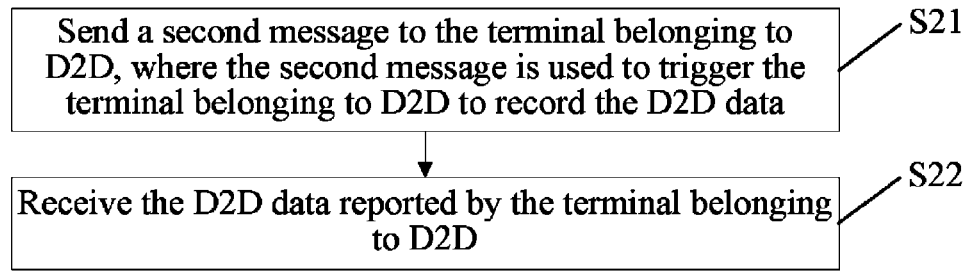
FIG. 2 is a schematic flowchart about step S12 in the first embodiment.

Referring to FIG. 2, FIG. 2 shows a specific description about step S12 in the first embodiment. Step S12 includes:

Step S21: Send a second message to the terminal belonging to D2D, where the second message is used to trigger the terminal belonging to D2D to record the D2D data.

Specifically, after the terminal belonging to D2D receives the second message, the terminal belonging to D2D may record the D2D data in a temporary storage manner.

Further, the second message further includes a recording policy used when the terminal belonging to D2D records the D2D data; and the terminal belonging to D2D records the D2D data according to the recording policy included in the first message.

In one implementation manner, the recording policy in the second message includes: a data amount of the D2D data that the terminal belonging to D2D needs to record; for example, the recording policy in the second message indicates that the terminal belonging to D2D needs to record 1024 bytes of the D2D data. In another implementation manner, the recording policy in the second message includes: that the terminal belonging to D2D needs to record the D2D data within T time, where T is a period of time; for example, the recording policy in the second message indicates that the terminal belonging to D2D needs to record the D2D data within a total of 10 minutes from 12:00 to 12:10. It can be understood that, a person skilled in the art may appropriately set, as required, the recording policy used when the terminal belonging to D2D records the D2D data, for example, duration that the recorded D2D data needs to be stored is indicated in the recording policy, and the like. This embodiment does not limit the specific recording policy.

Step S22: Receive the D2D data reported by the terminal belonging to D2D.

Specifically, the terminal belonging to D2D may passively report the recorded D2D data to the base station when receiving an instruction of the base station to report the D2D data; or actively report the recorded D2D data to the base station when recording the D2D data is completed; or actively or passively report the recorded D2D data at another right time, for example, when the base station is idle, the base station instructs the terminal belonging to D2D to report the recorded D2D data. It can be understood that, after reporting the recorded D2D data to the base station, the terminal belonging to D2D may immediately delete the D2D data or delete the D2D data after storing the D2D data for a period of time.

In this embodiment, a terminal belonging to D2D records D2D data, and then sends the D2D data to a base station; interception of the D2D data is mainly implemented by a terminal, and therefore impact on the base station is relatively small and may not cause an increase of burden on the base station.

Figure 3:
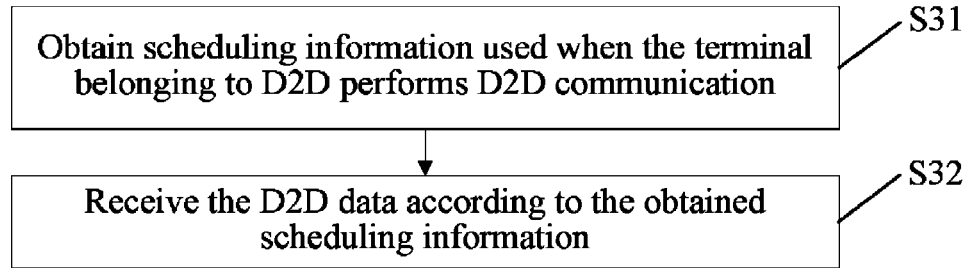
FIG. 3 is a schematic flowchart about step S12 in the first embodiment.

Referring to FIG. 3, FIG. 3 shows another specific description about step S12 in the first embodiment. Step S12 includes:

Step S31: Obtain scheduling information used when the terminal belonging to D2D performs D2D communication.

Based on a D2D idea, when the terminal belonging to D2D establishes the D2D communication, the terminal belonging to D2D may determine the scheduling information used during the D2D communication, where the scheduling information includes a wireless resource; the base station may also allocate, to the terminal belonging to D2D, the scheduling information used during the D2D communication; therefore, in step S31, there are two possible implementation manners for obtaining the scheduling information used when the terminal belonging to D2D performs the D2D communication. In one implementation manner, when the scheduling information is determined by the terminal belonging to D2D, step S31 includes: sending a third message to the terminal belonging to D2D, where the third message is used to instruct the terminal belonging to D2D to report the scheduling information, and receiving the scheduling information reported by the terminal belonging to D2D. In the other implementation manner, when the scheduling information is allocated by the base station to the terminal belonging to D2D, step S31 includes: obtaining, by using the base station, the scheduling information used when the terminal belonging to D2D performs the D2D communication, for example, obtaining, from a scheduling information allocation record temporarily stored by the base station, the scheduling information allocated to the terminal belonging to D2D.

Step S32: Receive the D2D data according to the scheduling information obtained in step S31.

When the scheduling information used when the terminal belonging to D2D performs the D2D communication is obtained in step S31, the D2D data of the terminal belonging to D2D is received according to the scheduling information in step S32, thereby achieving an objective of performing interception of the D2D data. Herein, it should be noted that, if data transmitted according to the scheduling information uses a default modulation manner, when the D2D data is received according to the scheduling information in step S32, the received D2D data is demodulated in the default demodulation manner; if the data transmitted according to the scheduling information uses a special modulation manner, for example, a modulation manner is determined by the terminal belonging to D2D or a modulation manner is allocated by the base station to the terminal belonging to D2D, demodulation information required for receiving the D2D data further needs to be obtained according to the scheduling information in step S32, for example, the terminal belonging to D2D is instructed to upload the required demodulation information, or the required demodulation information is obtained from a record of the base station; after the required demodulation information is obtained, the obtained demodulation information is used to demodulate the D2D data received according to the scheduling information.

It can be understood that, when performing the D2D communication, the terminal belonging to D2D may perform encryption processing on the D2D data transmitted according to the scheduling information for security concerns. In this case, in step S32, corresponding encryption information (for example, key information or encryption algorithm information) further needs to be obtained, so that the obtained key information or encryption algorithm information is used to decrypt the D2D data received according to the scheduling information. Similarly, if the encryption information is determined by the terminal belonging to D2D, the terminal belonging to D2D is instructed to upload the encryption information; and if the encryption information is allocated by the base station to the terminal belonging to D2D, the encryption information is obtained by using the base station.

It should be noted that, when the D2D communication is established, the scheduling information, demodulation information, or encryption information used when the terminal belonging to D2D performs the D2D communication may be partially allocated by the base station to the terminal belonging to D2D, and partially determined by the terminal belonging to D2D. Therefore, the scheduling information, demodulation information, or encryption information that the terminal belonging to D2D is instructed to upload in the foregoing refers to a part determined by the terminal belonging to D2D.

In this embodiment, a base station receives D2D data according to a transmission resource used when a terminal belonging to D2D performs D2D communication, thereby implementing interception of the D2D data. The interception of the D2D data is mainly implemented by the base station, and therefore impact of interception on the terminal belonging to D2D can be reduced.

Figure 4:
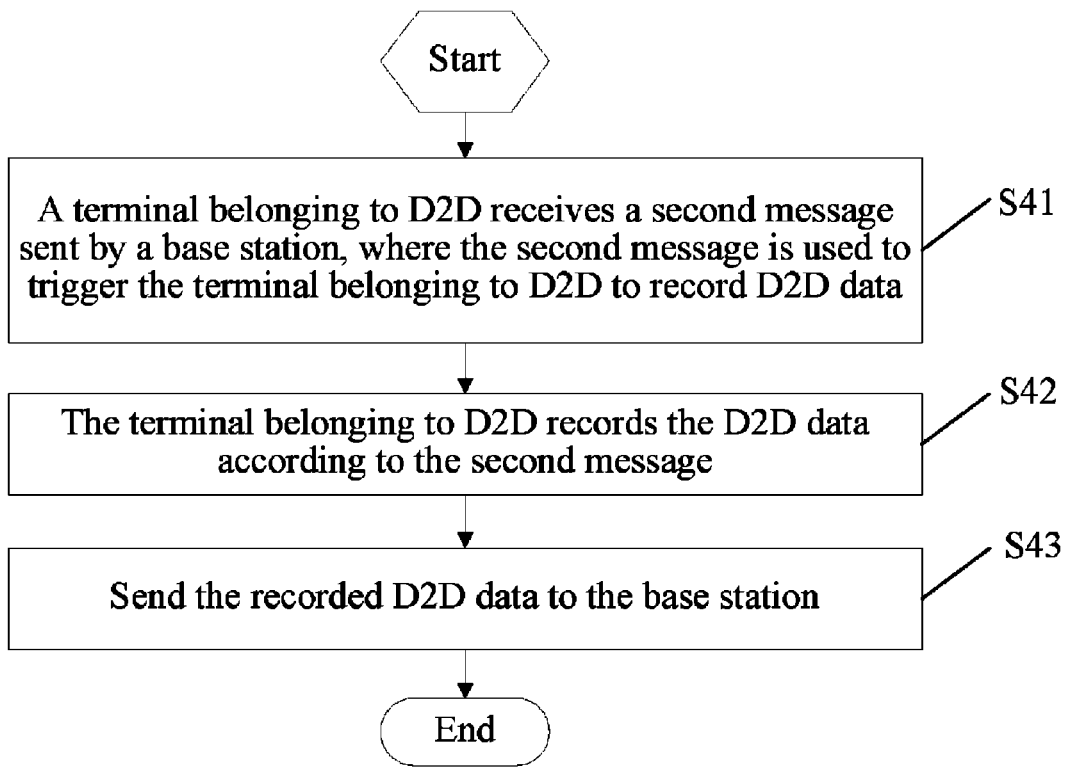
FIG. 4 is a schematic flowchart of a second embodiment of a communication interception method provided by the present invention.

Referring to FIG. 4, FIG. 4 is a schematic flowchart of a second embodiment of a communication interception method provided by the present invention. A difference between FIG. 4 and FIG. 1 is that, the process of the method in FIG. 4 may be executed by a terminal belonging to D2D, where the terminal belonging to D2D may be a mobile phone, a PDA (Personal Digital Assistant, personal digital assistant), and the like. Specifically, the process of the method in FIG. 4 includes:

Step S41: A terminal belonging to D2D receives a second message sent by a base station, where the second message is used to trigger the terminal belonging to D2D to record D2D data of the terminal.

Step S42: The terminal belonging to D2D records the D2D data according to the second message.

Specifically, in step S42, a temporary storage manner may be used to record the D2D data.

Further, the second message sent by the base station further includes a recording policy used when the terminal belonging to D2D records the D2D data of the terminal; in step S42, when the D2D data is recorded, the D2D data is recorded according to the recording policy in the second message.

In one implementation manner, the recording policy in the second message includes: a data amount of the D2D data that the terminal belonging to D2D needs to record; for example, the recording policy indicates that the terminal belonging to D2D needs to record 1024 bytes of the D2D data. In another implementation manner, the recording policy in the second message includes: that the terminal belonging to D2D needs to record the D2D data within T time, where T is a period of time; for example, the recording policy indicates that the terminal belonging to D2D needs to record the D2D data within a total of 5 minutes from 12:10 to 12:15. It can be understood that, a person skilled in the art may appropriately set, as required, the recording policy used when the terminal belonging to D2D records the D2D data, for example, duration that the recorded D2D data needs to be stored is indicated in the recording policy, and the like.

Step S43: The terminal belonging to D2D sends the recorded D2D data to the base station.

Specifically, in step S43, the recorded D2D data may be passively reported to the base station when an instruction of the base station to report the D2D data is received; or in step S43, the D2D data recorded in step S42 may be actively sent to the base station when recording the D2D data is completed in step S42; or in step S43, the recorded D2D data is actively or passively reported at another right time, for example, when an instruction to report the D2D data, which is sent by the base station when the base station is idle, is received, the D2D data recorded in step S42 is reported to the base station. In addition, it should be noted that, after sending the recorded D2D data to the base station, the terminal belonging to D2D may immediately delete the D2D data or delete the D2D data after storing the D2D data for a preset duration (for example, one hour or one day).

In this embodiment, a terminal belonging to D2D records D2D data, and then sends the D2D data to a base station, thereby implementing interception of the D2D data. The interception of the D2D data is mainly implemented by a terminal, and therefore impact on the base station is relatively small and may not cause an increase of burden on the base station.

The foregoing exemplifies the communication interception method according to the embodiments of the present invention in terms of the processes of the method. The following exemplifies a base station, a terminal, and a system including the base station and the terminal according to the embodiments of the present invention in accordance with the processes of the method.

Figure 5:
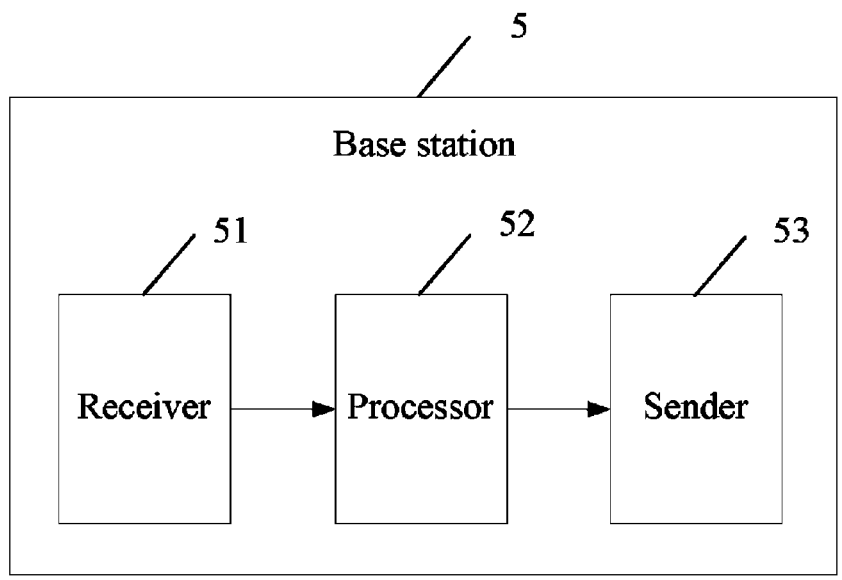
FIG. 5 is a schematic structural diagram of an embodiment of a base station provided by the present invention.

Referring to FIG. 5, FIG. 5 is a schematic structural diagram of an embodiment of a base station in the present invention. The base station 5 may be an ENB in the 3GPP. Specifically, the base station 5 includes:

A receiver 51, configured to receive a first message sent by a first device, where the first message is used to instruct interception of D2D data of a terminal belonging to D2D.

The first device may be an MME, a PGW, an SGW, or a third-party client; for example, when the first device is the MME and the base station 5 is the ENB, the MME sends the first message to the ENB through an interface (this interface is called an "S1" interface) between the MME and the ENB, and carries, in the message, an identity of the terminal belonging to D2D that is required to be intercepted, so as to indicate to the ENB the specific terminal belonging to D2D that is required to be intercepted. It should be noted that, the third-party client is defined relative to the MME, the SGW, and the PGW. The MME, the SGW, and the PGW are devices in a core network, and the third-party client refers to a device in a non-core network. For example, the third-party client may be implemented by using a notebook computer. After the notebook computer is connected to the base station, the notebook computer may send the first message to the base station, to instruct the base station to intercept the D2D data of the terminal belonging to D2D. It should be noted that, the D2D data refers to data directly sent from one terminal to another terminal without being forwarded by a network.

A processor 52, configured to obtain the D2D data according to the first message.

There are many manners for the processor 52 to obtain the D2D data, for example: the D2D data is actively uploaded by the terminal belonging to D2D, or the D2D data of the terminal belonging to D2D is received according to scheduling information used when the terminal belonging to D2D performs D2D communication.

A sender 53, configured to send the D2D data obtained by the processor 52 to the first device.

In this embodiment, it should be noted that, in a D2D idea, when a terminal performs D2D communication, signaling for implementing the D2D communication is completely or partially carried by a network (including a base station, an MME, and the like). Therefore, the network can know when the terminal is performing the D2D communication, and thereby the D2D data generated during the D2D communication can be intercepted at the right time.

In the embodiment of the present invention, a first message used to intercept D2D data of a terminal belonging to D2D is sent to a base station, and the base station obtains the D2D data of the terminal belonging to D2D according to the received first message; therefore, the base station implements interception of the D2D data, preventing a defect of failing to intercept the D2D data because of the fact that the D2D data is not carried by a network in the prior art.

The following provides more specific supplementary descriptions of implementing, by the base station shown in FIG. 5, the interception of the D2D data.

In one implementation manner, the sender 53 is further configured to send a second message to the terminal belonging to D2D, where the second message is used to trigger the terminal belonging to D2D to record the D2D data of the terminal.

Specifically, the second message further includes a recording policy used when the terminal belonging to D2D records the D2D data, where the terminal belonging to D2D records the D2D data according to the recording policy in the second message, to implement interception of the D2D data. For example, the recording policy may include: a data amount of the D2D data that needs to be recorded, where the size of the data amount may be flexibly set as required, and is not limited in this embodiment. The recording policy may further include: that the D2D data within T (T is a period of time) time needs to be recorded, where T may be set to 12:00 to 12:05 or 13:00 to 14:00, or another period of time, and is not specifically limited in this embodiment. The recording policy may be further appropriately set according to an actual requirement, for example, duration that the recorded D2D data needs to be stored is indicated in the recording policy. This embodiment does not limit specific content of the recording policy.

The receiver 51 is further configured to receive the D2D data reported by the terminal belonging to D2D.

Specifically, the terminal belonging to D2D may passively report the D2D data to the base station after receiving an instruction of the base station to report the D2D data; or actively report the recorded D2D data to the base station after recording the D2D data is completed; or actively or passively report the recorded D2D data to the base station at another right time, for example, when receiving a reporting instruction sent by the base station when the base station is idle, passively report the D2D data to the base station. It can be understood that, after reporting the D2D data, the terminal belonging to D2D may immediately delete the reported D2D data or delete the D2D data after storing the D2D data for a preset duration (for example, one hour or one day).

In this implementation manner, the terminal belonging to D2D records the D2D data, and then reports the D2D data to the base station, thereby implementing interception of the D2D data. In this implementation manner, interception of the D2D data is recorded by the terminal belonging to D2D; therefore, for the base station, a relatively small resource is required for implementing the interception of the D2D data, thereby reducing burden on the base station.

In another implementation manner, the processor 52 is further configured to obtain the scheduling information used when the terminal belonging to D2D performs the D2D communication; and receive the D2D data according to the scheduling information.

Specifically, in the D2D communication, the scheduling information may be determined by the terminal belonging to D2D, and may be allocated by the base station to the terminal belonging to D2D. Therefore, when the scheduling information is determined by the terminal belonging to D2D, the processor 52 sends a third message to the terminal belonging to D2D, where the third message is used to instruct the terminal belonging to D2D to report the scheduling information, the receiver 51 receives the scheduling information reported by the terminal belonging to D2D, and the processor 52 obtains the scheduling information from the receiver 51. When the scheduling information is allocated by the base station to the terminal belonging to D2D, the processor 52 obtains the scheduling information by using the base station.

When the processor 52 obtains the scheduling information, the D2D data of the terminal belonging to D2D is received according to the scheduling information, thereby implementing interception of the D2D data. It can be understood that, if data transmitted according to the scheduling information uses a default modulation manner, when the processor 52 receives the D2D data according to the scheduling information, the D2D data is demodulated by using default demodulation information; if the data transmitted according to the scheduling information uses a special modulation manner, where the special modulation manner includes a modulation manner determined by the terminal belonging to D2D or a modulation manner allocated by the base station to the terminal belonging to D2D during the D2D communication, when the processor 52 receives the D2D data according to the scheduling information, demodulation information corresponding to the special modulation manner is used to demodulate the D2D data, where when the special modulation manner is determined by the terminal belonging to D2D, the terminal belonging to D2D is instructed to report the corresponding demodulation information, and when the special modulation manner is allocated by the base station to the terminal belonging to D2D, the corresponding demodulation information is obtained by using the base station. It can be understood that, when performing the D2D communication, the terminal belonging to D2D may encrypt the D2D data transmitted according to the scheduling information for security concerns. In this case, the processor 52 further needs to obtain encryption information (including but not limited to a key) used when the D2D data is encrypted, and use the obtained encryption information to decrypt the D2D data. Similarly, if the encryption information is determined by the terminal belonging to D2D, the terminal belonging to D2D is instructed to upload the encryption information; if the encryption information is allocated by the base station to the terminal belonging to D2D, the encryption information is obtained by using the base station. It should be noted that, the scheduling information, demodulation information, or encryption information used when the terminal belonging to D2D performs the D2D communication may be completely or partially allocated by the base station, or completely or partially determined by the terminal belonging to D2D. Therefore, the scheduling information, demodulation information, or encryption information that the terminal belonging to D2D is instructed to upload in the foregoing refers to a part determined by the terminal belonging to D2D.

In this embodiment, a transmission resource used when a terminal belonging to D2D performs D2D communication is obtained, and D2D data is received according to the transmission resource, so as to implement interception of the D2D data. The interception of the D2D data is mainly implemented by means of receiving, by the base station, the D2D data according to the transmission resource, with no need for the terminal belonging to D2D to spend any resource on the interception of the D2D data; therefore, impact on the terminal belonging to D2D is small.

Figure 6:
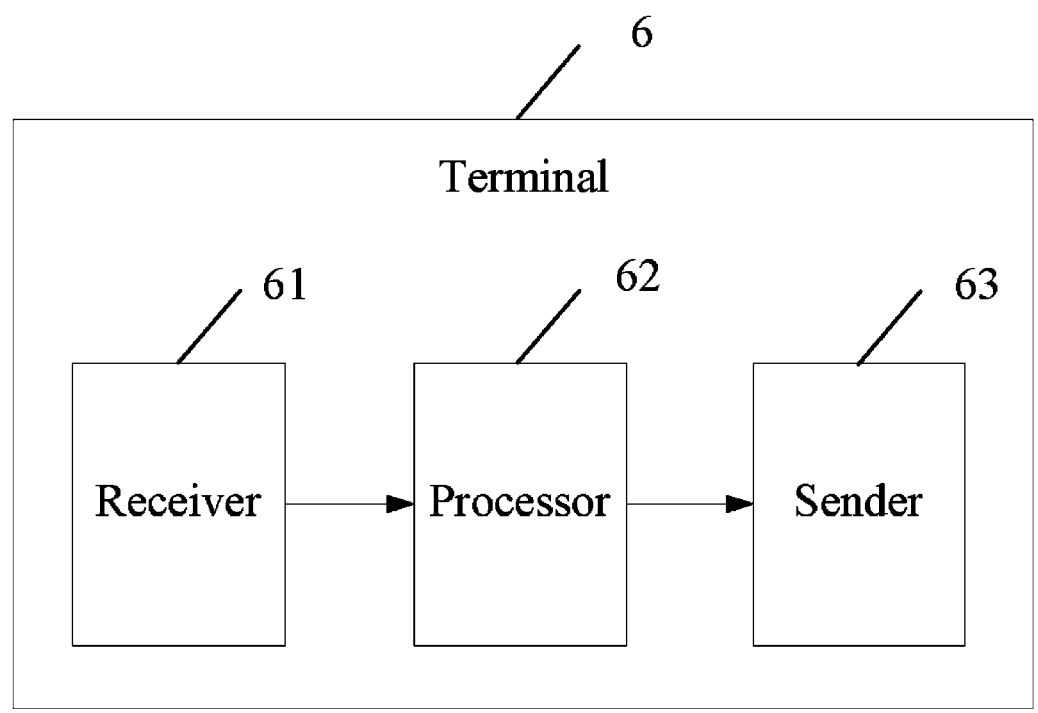
FIG. 6 is a schematic structural diagram of an embodiment of a terminal provided by the present invention.

Referring to FIG. 6, FIG. 6 is a schematic structural diagram of an embodiment of a terminal provided by the present invention. The terminal 6 may be a mobile phone, a PDA, or the like. Specifically, the terminal 6 includes:

A receiver 61, configured to receive a second message sent by a base station, where the second message is used to trigger the terminal 6 to record D2D data.

A processor 62, configured to record (for example, in a temporary storage manner) the D2D data of the terminal 6 according to the second message.

Further, the second message includes a recording policy used when the terminal 6 records the D2D data; when the receiver 61 receives the second message, the processor 62 records the D2D data according to the recording policy in the second message. Specifically, the recording policy may include: a data amount of the D2D data that the terminal 6 needs to record; for example, the recording policy indicates that the terminal 6 needs to record 1024 bytes of the D2D data. The recording policy may further include: that the terminal 6 needs to record the D2D data within T (T is a period of time) time; for example, the recording policy indicates that the terminal 6 needs to record the D2D data within a total of 10 minutes from 12:00 to 12:10. It can be understood that, a person skilled in the art may appropriately set, as required, the recording policy used when the terminal 6 records the D2D data, for example, duration that the recorded D2D data needs to be stored is indicated in the recording policy, and the like.

A sender 63, configured to send the D2D data recorded by the processor 62 to the base station.

Specifically, when the receiver 61 receives an instruction of the base station to report the D2D data, the sender 63 sends the D2D data recorded by the processor 62 to the base station; or when the processor 62 completes recording the D2D data, the sender 63 sends the D2D data recorded by the processor 62 to the base station; or the sender 63 may also send the D2D data recorded by the processor 62 to the base station at another right time, for example, when the receiver 61 receives the instruction to report the recorded D2D data, which is sent by the base station when the base station is idle. It can be understood that, after the sender 63 reports the D2D data to the base station, the processor 62 immediately deletes the reported D2D data or deletes the D2D data after storing the D2D data for a preset duration (for example, one day).

In this embodiment, the terminal 6 records D2D data, and sends the D2D data to a base station, thereby implementing interception of the D2D data. Such interception is mainly implemented by the terminal 6, and therefore impact on the base station is small and may not cause an increase of burden on the base station.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (Read-Only Memory, ROM), or a random access memory (Random Access Memory, RAM).

The foregoing descriptions are merely exemplary embodiments of the present invention, and may not limit the scope of the present invention. A person of ordinary skill in the art may understand that, equivalent changes made for implementing all or a part of the processes of the foregoing embodiments and according to the appended claims of the present invention still fall within the scope of the present invention.

What is claimed is:

1. A communication method, comprising:
   receiving, by a base station, a first message sent by a first device, wherein the first message is used to instruct the base station to obtain device-to-device (D2D) data of a second device belonging to a D2D communication with a third device;
   obtaining, by the base station, wireless resource scheduling information used when the second device belonging to the D2D communication performs the D2D communication, in response to the first message;
   obtaining, by the base station, the D2D data of the second device according to the obtained wireless resource scheduling information; and
   sending, by the base station, the obtained D2D data of the second device to the first device,
   wherein,
      when the wireless resource scheduling information is determined by the second device belonging to the D2D communication, the obtaining of wireless resource scheduling information used when the second device belonging to the D2D communication performs the D2D communication comprises,
         sending a second message to the second device belonging to the D2D communication, wherein the second message is used to instruct the second device belonging to the D2D communication to report the wireless resource scheduling information; and
         obtaining the wireless resource scheduling information reported by the second device belonging to the D2D communication; or
      when the wireless resource scheduling information is allocated by the base station to the second device belonging to the D2D communication, the obtaining of wireless resource scheduling information used when the second device belonging to the D2D communication performs the D2D communication comprises,
         obtaining the wireless resource scheduling information allocated by the base station.

2. The method according to claim 1, wherein the first device comprises: a mobility management entity (MME), a serving gateway SGW, a packet data network gateway PGW, or a fourth device.

3. The method according to claim 1, wherein the obtaining the D2D data according to the first message comprises:
   sending a third message to the second device belonging to the D2D communication, wherein the third message is used to trigger the second device belonging to the D2D communication to record the D2D data; and
   receiving the D2D data recorded by the second device belonging to D2D.

4. The method according to claim 3, wherein the third message comprises a recording policy used when the second device belonging to the D2D communication records the D2D data, and the recording policy comprises:
   a data amount of the D2D data that needs to be recorded, or a T period of time to record the D2D data.

5. A base station, comprising:
   a receiver, configured to receive a first message sent by a first device, wherein the first message is used to instruct the base station to obtain device-to-device (D2D) data of a second device belonging to the D2D communication with a third device;
   a processor, configured to
      obtain wireless resource scheduling information used when the second device belonging to the D2D communication performs the D2D communication, in response to the first message, and
      obtain the D2D data of the second device according to the obtained wireless resource scheduling information; and
   a sender, configured to send the obtained D2D data of the second device to the first device,
   wherein,
      when the wireless resource scheduling information is determined by the second device belonging to the D2D communication, the obtainment of wireless resource scheduling information used when the second device belonging to the D2D communication performs the D2D communication comprises,
         sending a second message to the second device belonging to the D2D communication, wherein the second message is used to instruct the second device belonging to the D2D communication to report the wireless resource scheduling information; and
         obtaining the wireless resource scheduling information reported by the second device belonging to the D2D communication; or
      when the wireless resource scheduling information is allocated by the base station to the second device belonging to the D2D communication, the obtainment of wireless resource scheduling information used when the second device belonging to the D2D communication performs the D2D communication comprises,
         obtaining the wireless resource scheduling information allocated by the base station.

6. The base station according to claim 5, wherein the device comprises: a mobility management entity MME, a serving gateway SGW, a packet data network gateway PGW, or a fourth device.

7. The base station according to claim 5, wherein:
   the sender is further configured to send a third message to the second device belonging to D2D communication, wherein the third message is used to trigger the second device belonging to D2D communication to record the D2D data; and
   the receiver is further configured to receive the D2D data recorded by the second device belonging to D2D communication.

8. The base station according to claim 7, wherein the third message comprises a recording policy used when the second device belonging to D2D communication records the D2D data, and the recording policy comprises: a data amount of the D2D data that needs to be recorded, or a T period of time to record the D2D data.

* * * * *